United States Patent
Martino

(10) Patent No.: US 8,061,465 B2
(45) Date of Patent: *Nov. 22, 2011

(54) THREE-WHEELED VEHICLE WITH CENTRALLY POSITIONED MOTOR AND DRIVER'S SEAT

(76) Inventor: Marc Gregory Martino, Westlake Village, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 12/460,104

(22) Filed: Jul. 14, 2009

(65) Prior Publication Data

US 2009/0277708 A1 Nov. 12, 2009

Related U.S. Application Data

(63) Continuation of application No. 11/218,836, filed on Sep. 1, 2005, now Pat. No. 7,588,110.

(51) Int. Cl.
*B62D 61/06* (2006.01)
(52) U.S. Cl. ........ 180/210; 180/311; 280/264; 280/267; 280/288.1
(58) Field of Classification Search .................. 180/210, 180/211, 212, 311, 312, 908; 280/264, 267, 280/288.1, 88
See application file for complete search history.

(56) References Cited

U.S. PATENT DOCUMENTS

| | | | | | |
|---|---|---|---|---|---|
| 3,610,358 | A | * | 10/1971 | Korff | 180/209 |
| 4,020,914 | A | * | 5/1977 | Trautwein | 180/210 |
| 4,351,410 | A | | 9/1982 | Townsend | |
| 4,573,546 | A | | 3/1986 | Irimajiri | |
| 4,662,468 | A | | 5/1987 | Ethier | |
| 4,787,470 | A | | 11/1988 | Badsey | |
| 5,236,060 | A | | 8/1993 | Huber | |
| 5,248,011 | A | * | 9/1993 | Richards | 180/215 |
| 5,431,243 | A | | 7/1995 | Richards | |
| 5,947,222 | A | | 9/1999 | Yamaoka | |
| 6,454,039 | B1 | * | 9/2002 | Matsuura | 180/336 |
| 7,416,046 | B2 | * | 8/2008 | Aube et al. | 180/312 |

OTHER PUBLICATIONS www.go-t-rex.com.
www.3wheelers.com.
MAXIM Magazine, May 2005, p. 45, "Auto Erotic".

* cited by examiner

*Primary Examiner* — Paul N Dickson
*Assistant Examiner* — Laura Freedman

(57) ABSTRACT

Disclosed is a three-wheeled vehicle with centrally positioned motor and driver's seat. An exemplary embodiment has a frame for supporting a driver and a multitude of mechanical devices. A pair of steerable front wheels are rotatably affixed to the front portion of the frame. A rear wheel is rotatably affixed along the frame's centerline in the rear portion. A motor is affixed to the frame's centerline. The driver's seat is also affixed to the frame's centerline behind the motor and ahead of the rear wheel, so the driver sitting in the driver seat is in both a recumbent and straddle position.

18 Claims, 9 Drawing Sheets

THREE-WHEELED VEHICLE WITH CENTRALLY POSITIONED MOTOR AND DRIVER'S SEAT

CROSS-REFERENCE TO RELATED APPLICATIONS

This patent application is a continuation to the original application Ser. No. 11/218,836 filed on Sep. 1, 2005 now U.S. Pat. No. 7,588,110.

FIELD OF THE INVENTION

The present invention relates in general to vehicles, and in particular to a three-wheeled vehicle with a motor and driver seat centrally positioned within a frame where the driver sits in a recumbent and straddle position.

BACKGROUND OF THE INVENTION

Performance oriented motorcycles and automobiles are an enormous industry. Countless amounts of money and time are spent refining these vehicles for increased performance. Yet, motorcycles and automobiles have different advantages. Automobiles are inherently stable due to the use of four wheels, while motorcycles are inherently unstable vehicles due to the use of only two wheels. Accordingly, motorcycles require constant balance by a rider and are prone to falling over when controlled by an inexperienced rider. Automobiles are safer vehicles, not only due to their inherent stability but because they have a surrounding frame that can absorb impact during a crash. The rider of the motorcycle has no surrounding frame and will be thrown from the motorcycle during an accident. Due to these reasons, motorcycles are dangerous vehicles to drive on public roads shared with significantly heavier vehicles. Even though a motorcycle is more dangerous, it does have advantages. Due to lighter weight, motorcycles generally accelerate faster and use less fuel. Automobiles are generally heavier and require a correspondingly higher amount of horsepower to match the acceleration of the motorcycle.

Although motorcycles are lighter, they do not actually corner better than automobiles. The automobile is an inherently stable vehicle due to the use of four wheels. At any moment the automobile can perform a sharp turn. For the motorcycle to make a sharp turn, the rider must also lean the bike. To turn the motorcycle, the rider must not only turn the handlebars of the motorcycle, but shift the weight of the motorcycle into the direction of the turn. While cornering, if the weight of the motorcycle hasn't shifted the motorcycle will crash. The time differential it takes to lean the motorcycle to make a turn can mean the difference between avoiding an accident or having an accident. Additionally, an automobile's center of gravity always stays within the width of the vehicle, increasing the vehicle's stability. A motorcycle's center of gravity moves while turning. As the motorcycle turns and leans, the center of gravity moves down and inward into to the turn. The center of gravity actually shifts beyond the tire patch in contact with the road. If a rider hits a patch of loose gravel while turning, the motorcycle can lose traction and come out from under the rider and crash.

Motorcycles also have a cornering disadvantage due to their rounded tire design. A motorcycle tire is shaped like a donut, having rounded edges. The rounded design is necessary to allow the bike to lean while making a turn. The rounded tire creates a small tire patch in the shape of an oval that is in contact with the road. Performance of any vehicle is dependent upon the amount of traction, and traction is directly related to the amount of surface area between the tire and the road. Motorcycles have very small tire patches in contact with the road. The automobile utilizes a generally cylindrical tire shape because the tire does not need to lean to make a turn. The cylindrical tire isn't rounded but rather in the shape of a cylinder. This creates a larger rectangular tire patch in contact with the road. In addition, the cylindrical tire shape is usually wider than the motorcycle tire which adds to the tire surface in contact with the road. The larger amount of area in contact with the road leads to improved cornering, as well as improved acceleration and braking.

Furthermore, motorcycles have a high center of gravity which limits cornering capability. A seasoned motorcycle rider must substantially lean the bike to lower the center of gravity to corner around an aggressive turn. In an automobile, the center of gravity is constant and to make an aggressive turn the automobile driver has only to turn the steering wheel. As can be seen, the motorcycle and automobile each have advantages over the other. It can be seen that there is a need for a vehicle that can combine the strengths of automobiles and motorcycles.

All-Terrain Vehicles (ATVs) are a mix between automobiles and motorcycles. ATVs usually have a motorcycle like engine placed within a frame. The rider sits atop the ATV frame and controls the ATV in a similar manner as the motorcycle. Also, the driver positioning in the ATV is generally similar as that of the motorcycle; being on-top and above the vehicle. The driver seat in an ATV is not meant to keep the rider secured to the ATV. While driving an ATV, the rider will lean his body to make turns. During many maneuvers the rider will not even be seated on the ATV seat. ATVs are intended for off road use as they are not suitable for public roads. ATV's have the wrong tire design for the road, as the ATV tire would prematurely wear away on hard pavement. Also, the ATV has a high center of gravity making it a poor road vehicle to corner. Furthermore, the ATV has tires positioned too close together to provide the stability needed for a road going vehicle. Also, the ATV provides no further protection in a crash than does a motorcycle. Driving an ATV on the road shared with automobiles is as dangerous as driving a motorcycle on the road with automobiles. For some of the above mentioned reasons, it is illegal to drive ATVs on roads used by automobiles and motorcycles.

Past attempts have been made to produce a three-wheeled vehicle. Many designs have utilized two cylindrical tires in the front with a single cylindrical tire in the rear. These vehicles are supported in three places, making them inherently stable. However, a driver and a passenger sit side-by-side in a recumbent position as is similar to the seating position in an automobile. The driver operates the vehicle through the use of a steering wheel and foot controls as is done in an automobile. These vehicles are close in design to the automobile differing with only the use of a single rear wheel. Some vehicles have placed the driver along the centerline in a recumbent position with the engine either completely ahead or completely behind the driver. Once again, the driver operates the vehicle through the use of a steering wheel and foot controls as is done in an automobile. These vehicles are also close in design to the automobile differing by the use of a single rear wheel.

The previously mentioned vehicles have failed to incorporate the driving experience of the motorcycle into an inherently stabilized vehicle. A motorcycle draws some of its appeal due to the unique driver positioning. In a motorcycle the driver straddles the vehicle with his legs. The driver straddles either the engine assembly, transmission assembly, or the gas tank. Straddling the vehicle results in a shorter vehicle, as extra room is not needed to allow a driver to stretch out in the traditional recumbent position of an automobile. Prior vehicles have generally placed the engine either completely ahead or behind of the driver and passenger, resulting in a longer than necessary vehicle. Much of the appeal of the motorcycle is lost when the driver does not straddle the vehicle. Further appeal is lost when the driver is not positioned in the middle of the vehicle. The driver being positioned next to the passenger is an automobile characteristic, not a motorcycle characteristic. Additionally, more of the appeal of the motorcycle is lost when the driver controls the vehicle with a steering wheel and foot controls, as opposed to the traditional motorcycle controls.

None of the previous vehicles have included various features that would be desirable in a single vehicle. It can be seen then that there is a need for a new class of vehicle designed for public road use that combines the best attributes of automobiles and motorcycles. There is a need for a vehicle to accelerate with the ease of a motorcycle due to its light weight, yet also be inherently stable through the use of three wheels. A need exists for a vehicle to have cylindrically shaped tires for increased acceleration, braking and cornering. A need exists for a three-wheeled vehicle to create a more similar driving experience to the motorcycle. A need exists for the vehicle to combine the straddle seating position of the motorcycle along the centerline of the vehicle with the recumbent seating position of the automobile. There is a need for a vehicle that does not require the driver to lean into a turn and has a lower center of gravity than a motorcycle. Furthermore, there is a desire for an inherently stable vehicle to utilize traditional motorcycle controls as opposed to the traditional automobile controls. Additionally, a desire also exists for a vehicle to provide greater safety than a motorcycle. Additionally, there is a desire for a vehicle to have a passenger seat positioned behind the driver seat in tandem where both seats are positioned along the centerline of the vehicle.

SUMMARY OF THE INVENTION

A three-wheeled vehicle for the transportation of a driver is disclosed. An exemplary embodiment of the three-wheeled vehicle has a frame for supporting the driver and a plurality of mechanical devices. The frame has a front portion, a rear portion, a vertical cross plane, a right portion, a left portion, and a vertical center plane. The front portion is opposite the rear portion and is generally divided by the vertical cross plane. The right portion is opposite the left portion and is generally divided by the vertical center plane. A pair of steerable front wheels are rotatably affixed to the frame. The pair of steerable front wheels are positioned at opposite sides of the front portion being equally separated by the vertical center plane. The pair of steerable front wheels rotate in both a pair of rolling axes and a pair of turning axes. The pair of rolling axes allow the pair of steerable front wheels to roll upon a surface. The surface is substantially perpendicular to both the vertical center plane and the vertical cross plane. The pair of rolling axes are substantially parallel with the surface. The pair of turning axes are substantially parallel to both the vertical center plane and the vertical cross plane. The driver can change direction of the pair of steerable front wheels relative to the orientation of the frame about the pair of turning axis through a driver steering input. A rear wheel is rotatably affixed to the frame generally centered along the vertical center plane and positioned about the rear portion behind the vertical cross plane. The rear wheel rotates in a rear rolling axis. The rear rolling axis is substantially parallel to the vertical cross plane and substantially perpendicular to the vertical center plane. The rear wheel can roll upon the surface. The pair of steerable front wheels and the rear wheel are substantially cylindrically shaped. A motor is affixed to the frame generally centered along the vertical center plane. A driver seat is affixed to the frame generally centered along the vertical center plane, behind the motor and ahead of the rear wheel. The driver sitting within the driver seat is in both a recumbent position and a straddle position. The driver seat has a seat bottom and a seat back. The seat bottom is substantially horizontal and the seat back is substantially vertical. The driver seat is generally positioned low within the frame. The driver seat can have lateral support to prevent the driver from falling out of the seat during cornering.

BRIEF DESCRIPTION OF THE DRAWINGS

Referring now to the drawings in which like reference numbers represent corresponding parts throughout.

DETAILED DESCRIPTION

Figure 1:
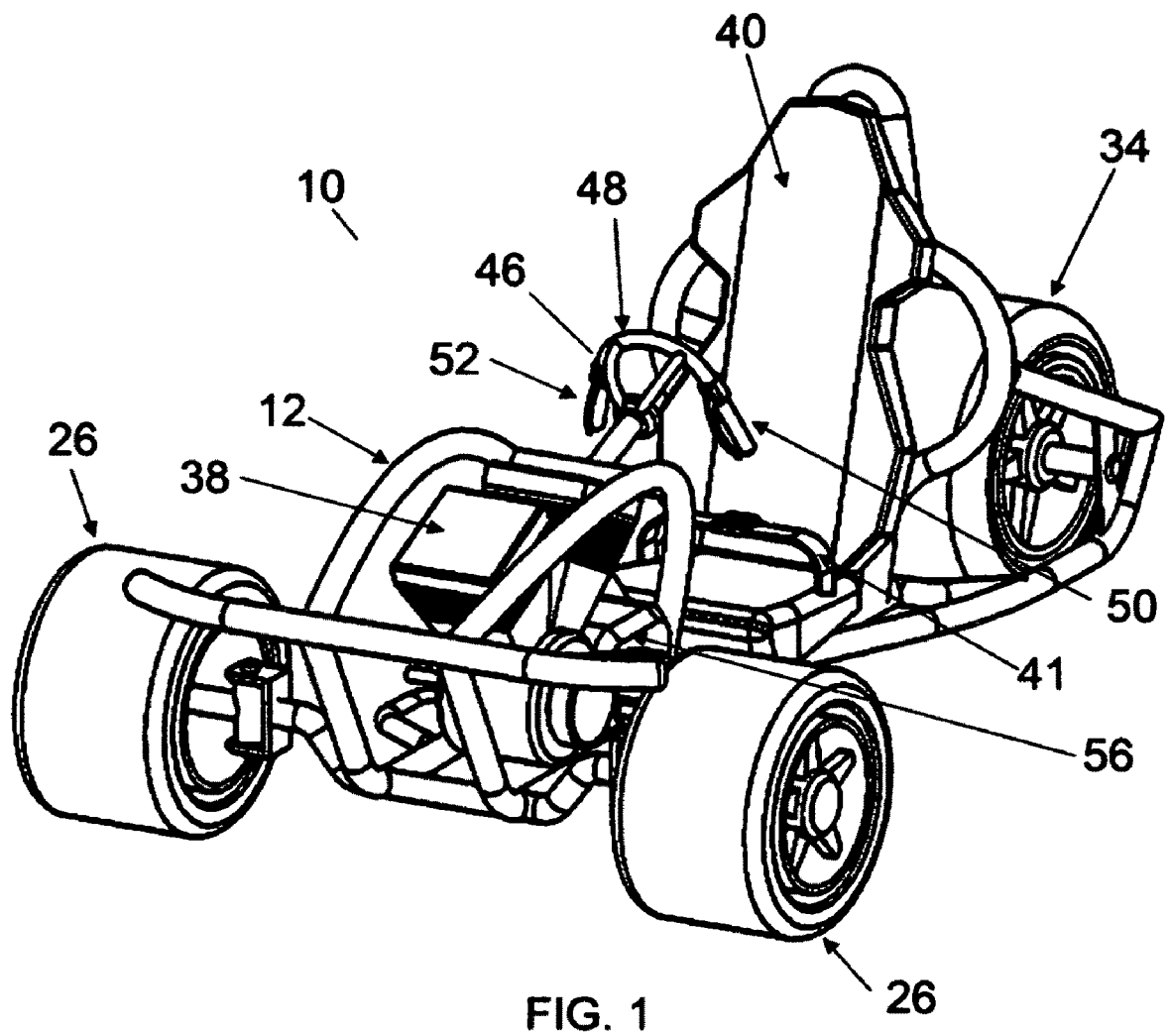
FIG. 1 illustrates an embodiment of a three-wheeled vehicle in an isometric view.
Figure 2:
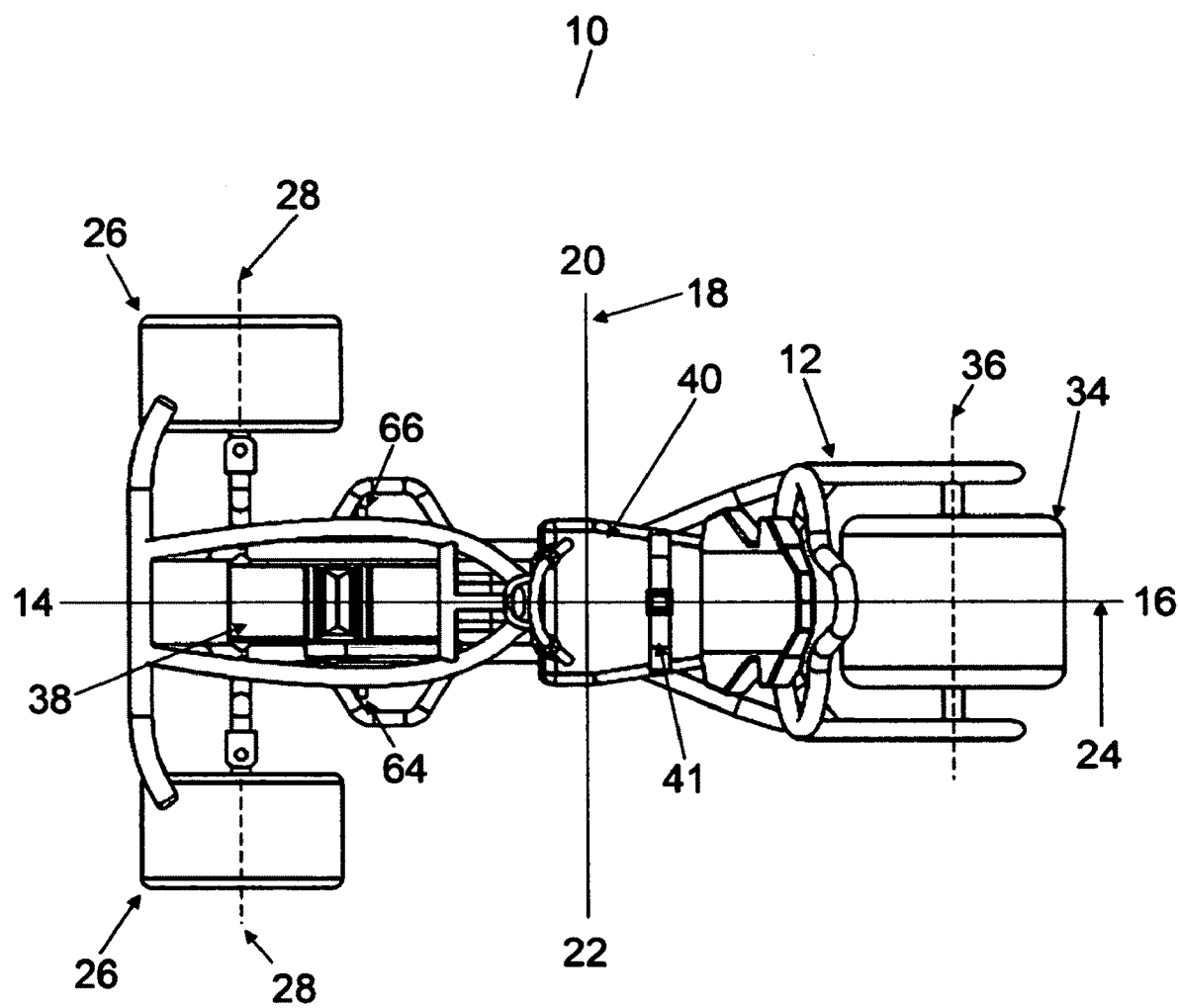
FIG. 2 illustrates the three-wheeled vehicle of FIG. 1 in a top view.
Figure 3:
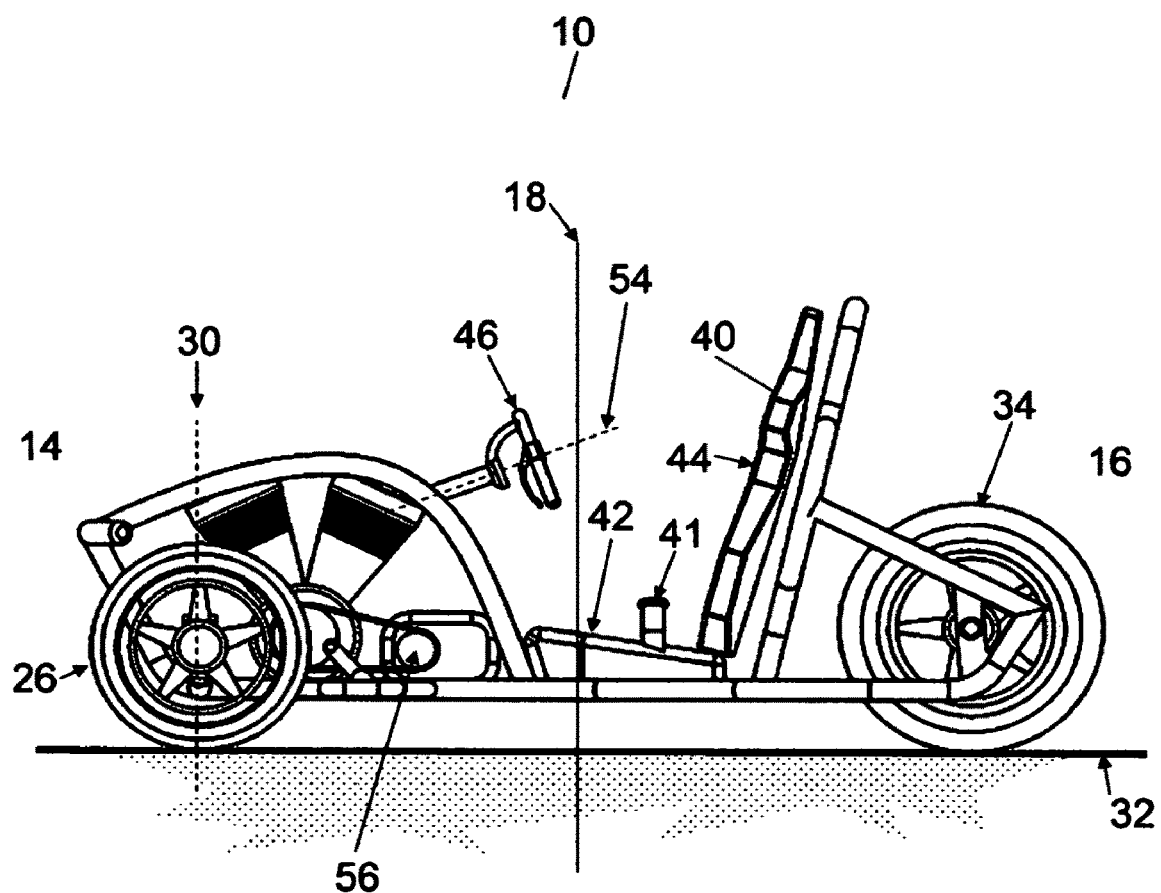
FIG. 3 illustrates the three-wheeled vehicle of FIG. 1 in a side view.
Figure 4:
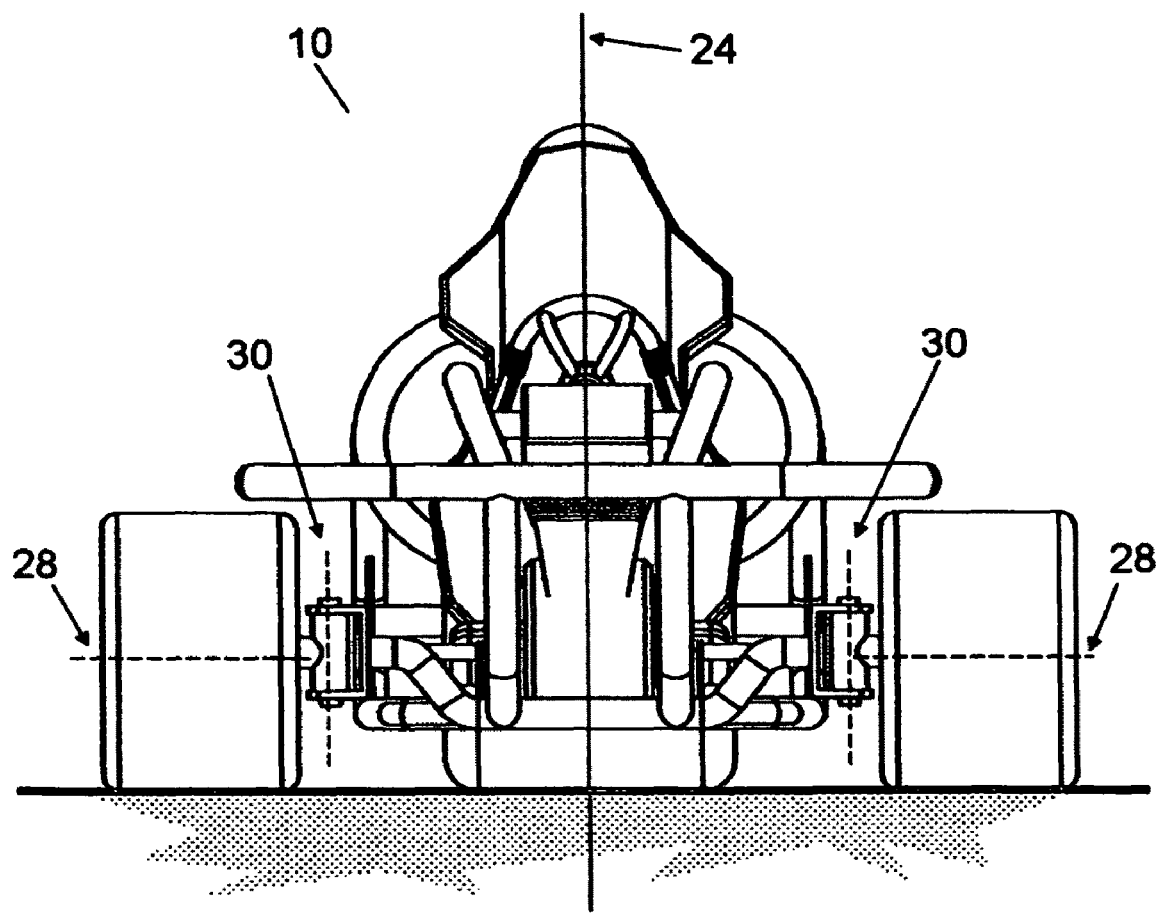
FIG. 4 illustrates the three-wheeled vehicle of FIG. 1 in a front view.
Figure 5:
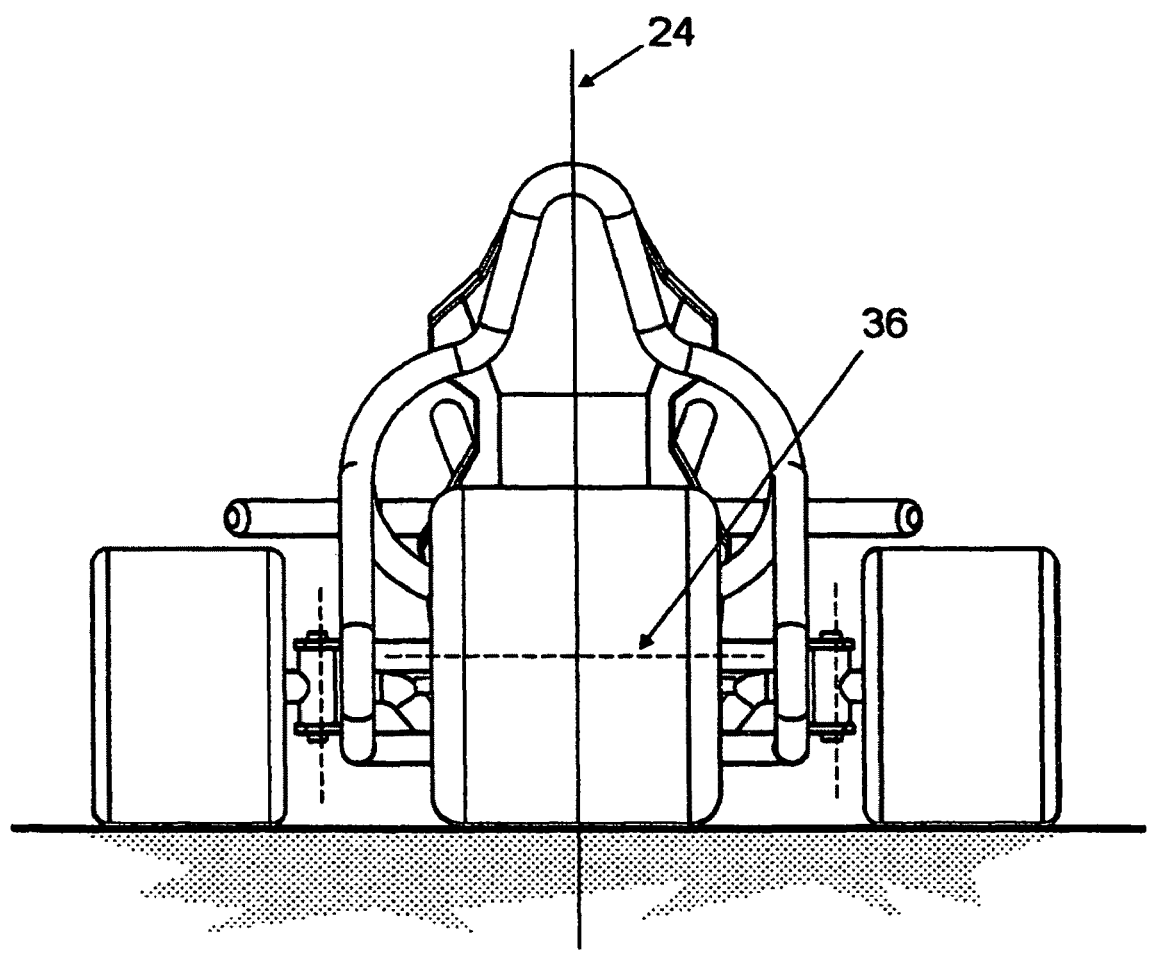
FIG. 5 illustrates the three-wheeled vehicle of FIG. 1 in a rear view.

In the following description of the exemplary embodiments, reference is made to the accompanying drawings that form a part hereof, and in which is shown merely by way of illustration. It is to be understood that other embodiments may be used and structural changes may be made without departing from the scope of the present invention.

An embodiment of a three-wheeled vehicle 10 is shown in FIGS. 1-5. The three-wheeled vehicle has a frame 12. A pair of steerable front wheels 26 and a rear wheel 34 are rotatably affixed to the frame 12. Also affixed to the frame 12 is a motor 38, a driver seat 40, and a steering mechanism 46. An exemplary steering mechanism is a handlebar assembly having a center handlebar portion 48, a left handlebar portion 50, and a right handlebar portion 52. A transmission 56 is also affixed to the frame 12.

The frame 12 has a front portion 14, a rear portion 16, a vertical cross plane 18, a right portion 20, a left portion 22, and a vertical center plane 24. The front portion 14 is opposite the rear portion 16, being divided by the vertical cross plane 18. The right portion 20 is opposite the left portion 22, being divided by the vertical center plane 24. The pair of steerable front wheels 26 are generally equally separated by the vertical center plane 24. The pair of steerable front wheels 26 rotate as a pair about a rolling axes 28. The rear wheel 34 is rotatably affixed to the frame 12 and rotates about a rear rolling axis 36. The motor 38 is affixed to the frame 12 generally centered along the vertical center plane 24. A driver seat 40 is also affixed to the frame 12 generally centered along the vertical center plane 24, and ahead of the rear wheel 34, and behind the motor 38. A driver sits in the driver seat 40 in both a recumbent and a straddle position. The driver straddles the motor 38 with the driver's right foot situated near a right-foot brake-control 66 and with the driver's left foot situated near a left-foot shifter-control 64.

The vertical cross plane 18 generally divides the front portion 14 from the rear portion 16. The pair of steerable front wheels 26 rotate both about a pair of rolling axes 28 and about a pair of turning axes 30. The pair of rolling axes 28 allow the steerable front wheels 26 to roll on a surface 32. Surface 32 is substantially perpendicular to both the vertical center plane 24 and the vertical cross plane 18. The rear wheel 34 rotates in a rear rolling axis 36 that is substantially parallel to the vertical cross plane 18 and substantially perpendicular to the vertical center plane 24. The rear rolling axis 36 allows the rear wheel 34 to roll on the surface 32. The motor 38 is configured to power at least one of the wheels of the three-wheeled vehicle 10. The motor 38 can be configured to power at least the rear wheel 34, or at least one of the pair of steerable front wheels 26, or all three wheels of the three-wheeled vehicle 10. The driver seat 40 is shown having a seat bottom 42 and a seat back 44. The driver sits within the driver seat 40 in both a recumbent and straddle position. The driver seat 40 may be positioned low within the frame 12 to lower the center of gravity of the three-wheeled vehicle 10. Generally, motorcycles have a driver seat positioned high which results in a higher center of gravity for the vehicle. To position the driver seat 40 low, means to position the seat generally lower than the typical motorcycle.

A transmission 56 is shown affixed to the frame 12. The transmission 56 is shown coupled to both the motor 38 and the rear wheel 34. The transmission 56 may be part of the motor 38 or may be separately attached to the frame 12. The steering mechanism 46 is affixed to the frame 12 generally centered along the vertical center plane 24 and positioned generally ahead of the driver seat 40 within reach of the driver. The steering mechanism 46 rotates about a steering input axis 54 that is substantially parallel to the vertical center plane 24. The steering mechanism 46 is coupled to the pair of steerable front wheels 26 such that the pair of steerable front wheels 26 can change direction about the pair of turning axes 30 through a driver steering input. The steering mechanism 46 can be any suitable means for the driver to control the direction of the vehicle through the driver steering input. Suitable means include, but are not limited to, a handlebar assembly, a steering wheel, a joystick and various combinations thereof.

The frame 12 is designed to support mechanical devices and a driver. The frame 12 can also be designed to accommodate a passenger and cargo. The frame 12 can be made from any suitable material that has sufficient skeletal integrity to support the three-wheeled vehicle 10, including but not limited to, metal, plastic, carbon fiber, composites, a combination thereof, or any other suitable material. Steel and aluminum are exemplary suitable materials for the manufacture of the frame 12. The frame 12 can be constructed as one piece or several pieces. The frame 12 can be cast, machined, welded, bolted or affixed together by any suitable manufacturing method. In an exemplary embodiment, the frame 12 is made from aluminum tubing that has been cut, bent and welded together providing a lightweight structure.

The pair of steerable front wheels 26 can be attached in many variations of suspension setups which allows the pair of steerable front wheels 26 to absorb road irregularities and lessen the transfer of vibration throughout the three-wheeled vehicle 10. Suitable suspension setups include, but are not limited to, leaf spring suspension, air ride suspension, and independent front suspensions. The pair of steerable front wheels 26 do not require a suspension, if simplicity of design and a rough ride are favored over the effort of adding a suspension setup. A suspension setup is not shown in the figures. The pair of steerable front wheels 26 are shown as controlled through the steering mechanism 46. The steering mechanism 46 can control the pair of steerable front wheels 26 through a rack-and-pinion steering control mechanism or any other suitable steering control mechanism. A front roll bar may be connected to the pair of steerable front wheels 26 when using a suspension setup to prevent body lean when the three-wheeled vehicle 10 corners.

The rear wheel 34 can also be attached to the frame 12 with or without a suspension setup. It is common for motorcycles to hard mount the rear tire directly to the vehicle's frame which simplifies the vehicle, but creates a rougher ride. Any suitable suspension setup can be utilized on the three-wheeled vehicle 10. In an exemplary embodiment, the rear wheel 34 can be suspended from a swing arm pivotably connected to the frame 12 and dampened with a shock absorber and a spring.

The motor 38 can be any type suitable for powering the three-wheeled vehicle 10, including but not limited to, internal combustion engines and electric motors. In an exemplary embodiment a motorcycle engine can be used, due to its small size and wide availability. The motor 38 can be mounted in any direction or location that allows the driver to sit behind the motor 38 in a recumbent position and a straddle position. The motor 38 can be located substantially along the vertical center plane 24 so that the driver can straddle the motor 38 and the three-wheeled vehicle 10 has a generally even weight distribution from right portion 20 to left portion 22. When the driver straddles the motor 38 it results in a shorter frame 12 as added length is not needed to allow the driver to stretch the driver's legs outward. A straddle position is one where the driver's legs are spread apart and are separated by some part of the vehicle. The legs may be separated by the engine, transmission, frame, gas tank or a combination thereof. A recumbent position is where the legs of the driver are generally ahead of the body of the driver. The driver sitting in a recumbent and a straddle position combines attributes of a motorcycle seating arrangement and a car seating arrangement, while the overall structure of the three-wheeled vehicle 10 avoids many of the various shortcomings present in motorcycles, automobiles and prior three-wheeled vehicles.

The transmission 56 is not required to make the three-wheeled vehicle 10 operate, but has certain benefits for internal combustion engines such as an availability of gear selections. The transmission 56 is shown mounted next to the motor 38 and along the vertical center plane 24, but can be positioned anywhere along the frame 12.

Figure 12:
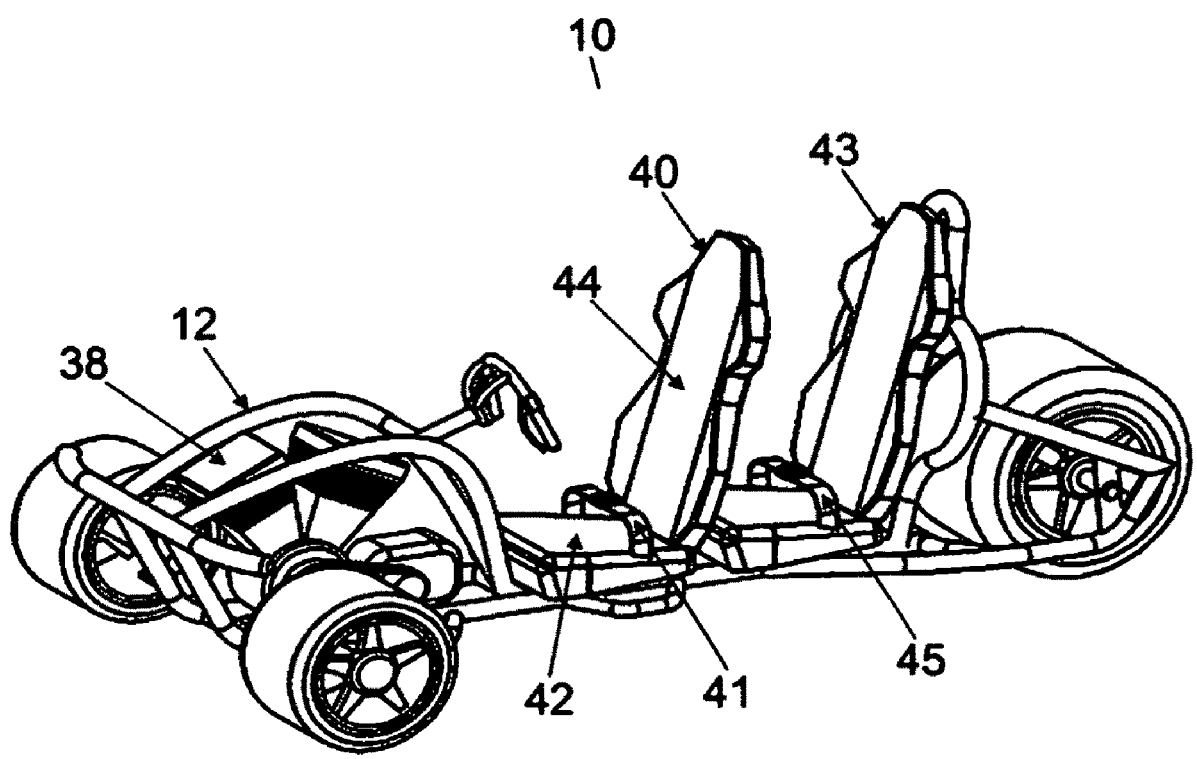
FIG. 12 illustrates another embodiment of a three-wheeled vehicle in an isometric view.

The driver seat 40 includes a seat bottom 42 that transfers the driver's body weight to the three-wheeled vehicle 10, and can also include a seat back 44 for extra support. A variety of seat designs can be used, as can a driver seat belt 41 (shown schematically) to help secure the driver to the three-wheeled vehicle 10. Because the three-wheeled vehicle 10 does not lean in a manner similar to the motorcycle as it corners, using a motorcycle type seat without lateral support could present problems. As the three-wheeled vehicle 10 turns, the driver's momentum is in a forward direction, thus a means for laterally supporting the driver is desired. This lateral support means can be accomplished with the use of the seat belt or from any suitable seat design. Seat designs can include but not be limited to, curvatures and extensions that hold the driver in place. These extensions can curve around the driver's legs or can curve around the driver's torso to provide lateral support. In an exemplary embodiment, a combination of lateral support means can be used to secure the driver to the three-wheeled vehicle 10. In another exemplary embodiment as shown schematically in FIG. 12, a passenger seat 43 and passenger seat belt 45 can also be added directly behind the driver seat to accommodate a passenger, where the passenger would straddle the driver, in a manner similar to the driver straddling the motor 38. The driver seat 40 and the passenger seat would be in tandem with one directly behind the other.

In an exemplary embodiment of the three-wheeled vehicle 10, the pair of steerable front wheels 26 and the rear wheel 34 are cylindrical wheels. Cylindrical wheels refers to and are the same type of tires used on traditional automobiles. A cylindrical wheel has a straight section across the width of the tire that is in contact with the road. A motorcycle wheel is rounded across the width of the tire. This rounded wheel of the motorcycle has a curve along the tread that allows the motorcycle to lean when the motorcycle corners. Cylindrical tires have larger tire patches in contact with the road. A motorcycle tire has a smaller, oval shaped tire patch, whereas a cylindrical wheel has a larger rectangular tire patch. The larger the tire patch, the more traction a vehicle achieves. More traction allows better acceleration, deceleration and cornering. The three-wheeled vehicle 10 is an inherently stable vehicle that does not lean, therefore it would be preferable to utilize wheels that are cylindrical, not rounded.

Figure 6:
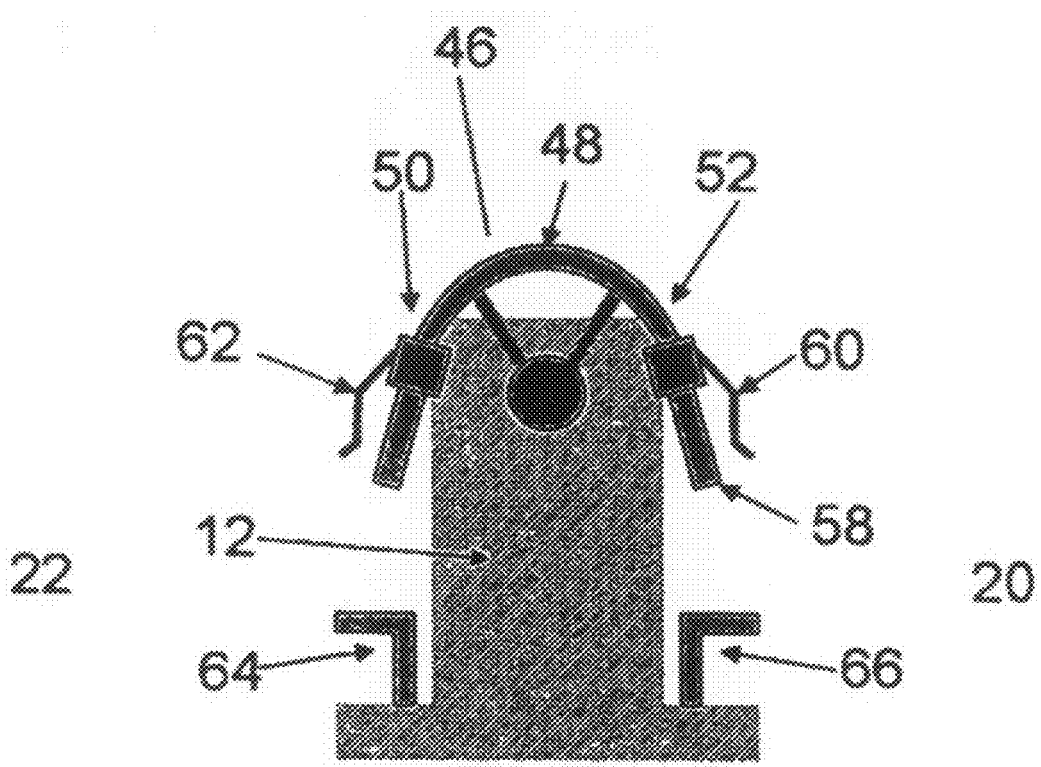
FIG. 6 illustrates an embodiment of a vehicle control system.

The three-wheeled vehicle 10 needs to allow the driver to control acceleration, braking and cornering. Various methods can be utilized to control the three-wheeled vehicle 10. An exemplary vehicle control system is shown in FIG. 6. The three-wheeled vehicle 10 is controlled through the steering mechanism 46. The steering mechanism 46 has a center handlebar portion 48, a left handlebar portion 50, and a right handlebar portion 52. The steering mechanism 46 is coupled to the pair of steerable front wheels 26, so that when the steering mechanism 46 is rotated about the steering input axis 54, it causes the pair of steerable front wheels 26 to rotate about the pair of turning axes 30. This coupling of the steering mechanism 46 and the steerable front wheels 26 can be a mechanical, hydraulic or an electronic coupling, or any combination thereof. Affixed to the right handlebar portion 52 are a rotatable throttle-control assembly 58 and a squeezable brake-control assembly 60. The rotatable throttle-control assembly 58 is coupled to the motor 38 to control the acceleration of the three-wheeled vehicle 10. The squeezable brake-control assembly 60 is coupled to at least the pair of steerable front wheels 26 to decelerate the three-wheeled vehicle 10. Affixed to the left handlebar portion 50 is a squeezable clutch-control assembly 62. Affixed to the frame 12 along the right portion 20 is a right-foot brake-control 66 within reach of the right foot of the driver. The right-foot brake-control 66 is coupled to at least the rear wheel 34 to decelerate the three-wheeled vehicle 10. Affixed to the frame 12 along the left portion 22 is a left-foot shifter-control 64 within reach of the left foot of the driver. The left-foot shifter-control 64 is coupled to the transmission 56. This embodiment is not intended to limit the methods of controlling the three-wheeled vehicle 10 as other variations can be made to the vehicle control system, such as moving components to opposites sides or moving components between the hand and foot controls.

Figure 7:
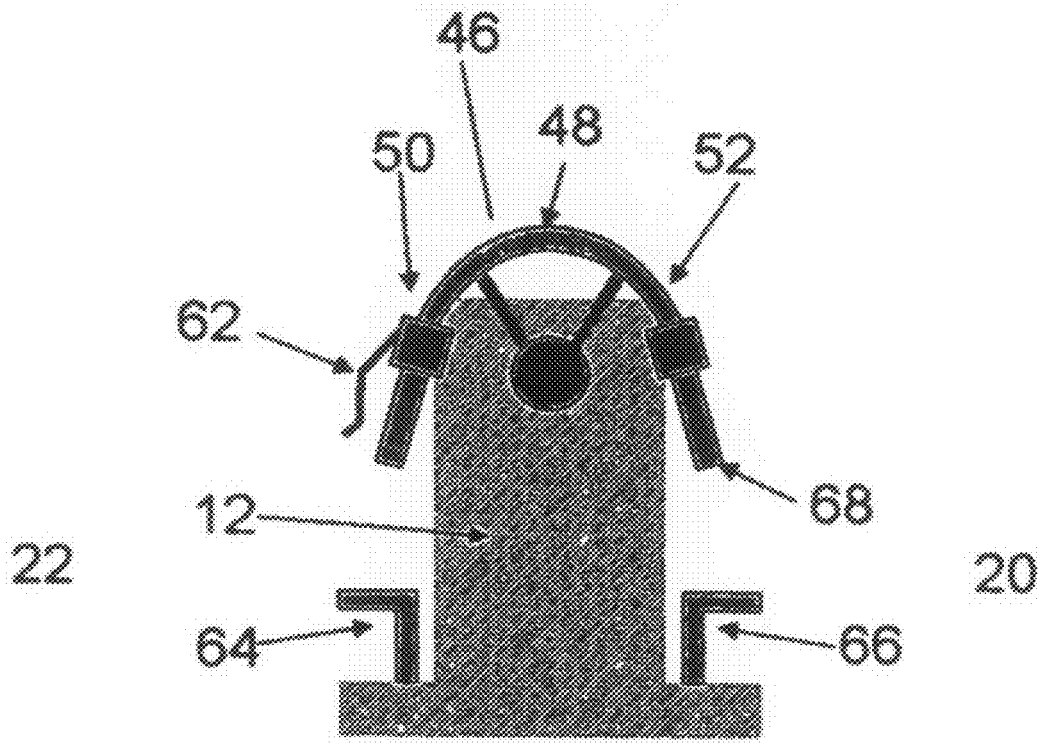
FIG. 7 illustrates another embodiment of a vehicle control system.

Another embodiment of a vehicle control system is shown in FIG. 7. In this embodiment, the right handlebar portion 52 is affixed to a right-hand throttle-control assembly 68. The right-hand throttle-control assembly 68 is coupled to the motor 38 to control acceleration of the vehicle. The right-hand throttle-control assembly 68 can be squeezable, rotatable, pushable, pullable or controlled in any other suitable method. Affixed to the frame 12 along the right portion 20 is a right-foot brake-control 66 within reach of the right foot of the driver. The right-foot brake-control 66 is coupled to at least one of the wheels of the three-wheeled vehicle 10. Preferably, the right-foot brake-control is coupled to at least the pair of steerable front wheels 26, since most of the three-wheeled vehicle 10 braking will occur in the front portion 14.

Figure 8:
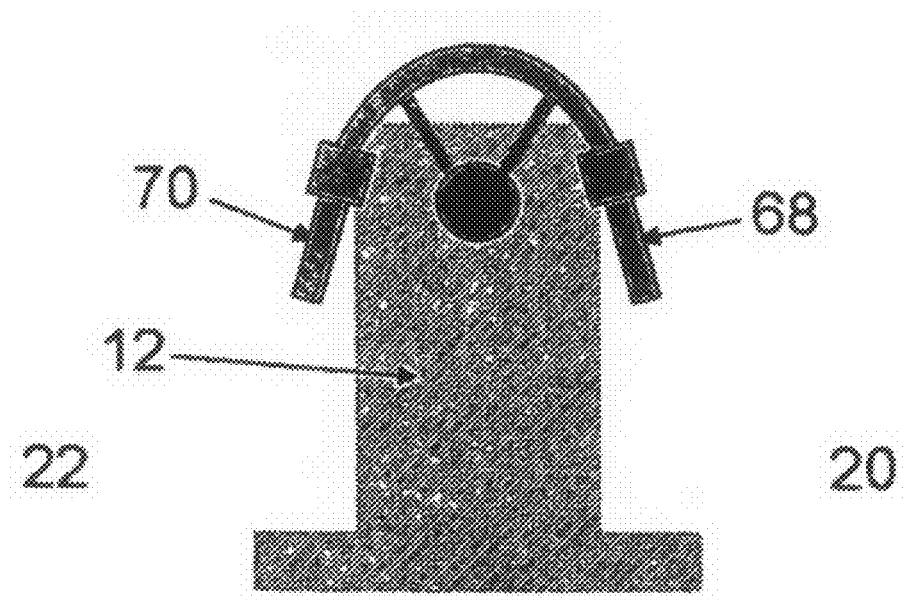
FIG. 8 illustrates another embodiment of a vehicle control system.

Another embodiment of a vehicle control system is shown in FIG. 8. Affixed to the right handlebar portion 52 is a right-hand throttle-control assembly 68. The right-hand throttle-control assembly 68 is coupled to the motor 38 to control acceleration of the vehicle. The right-hand throttle-control assembly 68 can be squeezable, rotatable, pushable, pullable or controlled in any other suitable method. Affixed to the left handlebar portion 50 is a left-hand brake-control assembly 70. The left-hand brake-control assembly 70 can be squeezable, rotatable, pushable, pullable or controlled in any other suitable method.

Figure 9:
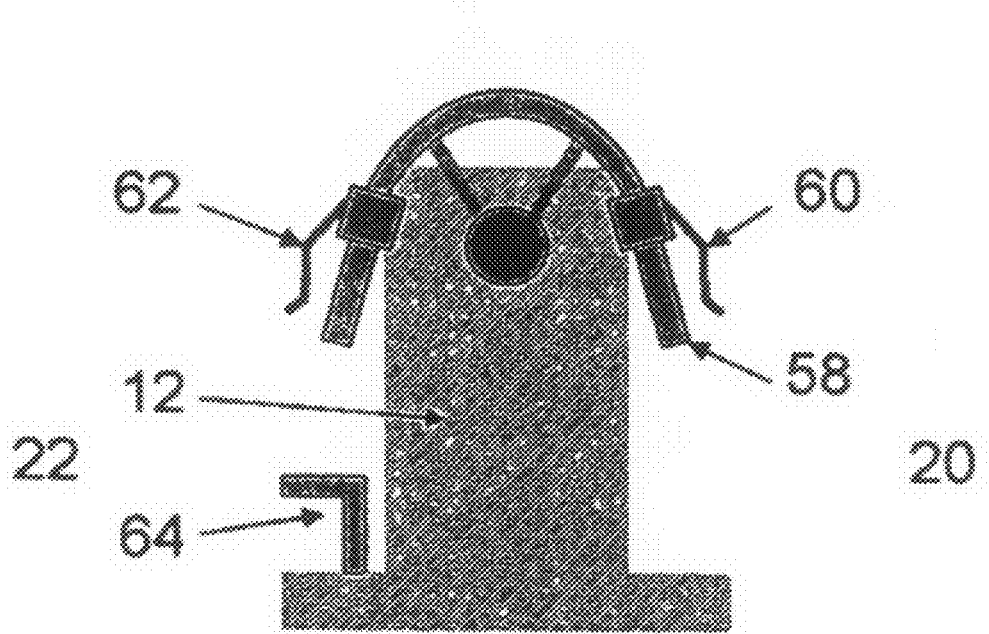
FIG. 9 illustrates another embodiment of a vehicle control system.

Another embodiment of a vehicle control system is shown in FIG. 9. Affixed to the right handlebar portion 52 are a rotatable throttle-control assembly 58 and a squeezable brake-control assembly 60. The rotatable throttle-control assembly 58 is coupled to the motor 38 to control the acceleration of the three-wheeled vehicle 10. The squeezable brake-control assembly 60 is coupled to at least the pair of steerable front wheels 26 to decelerate the three-wheeled vehicle 10. Affixed to the left handlebar portion 50 is a squeezable clutch-control assembly 62. Affixed to the frame 12 along the left portion 22 is a left-foot shifter-control 64 within reach of the left foot of the driver. The left-foot shifter-control 64 is coupled to the transmission 56.

Figure 10:
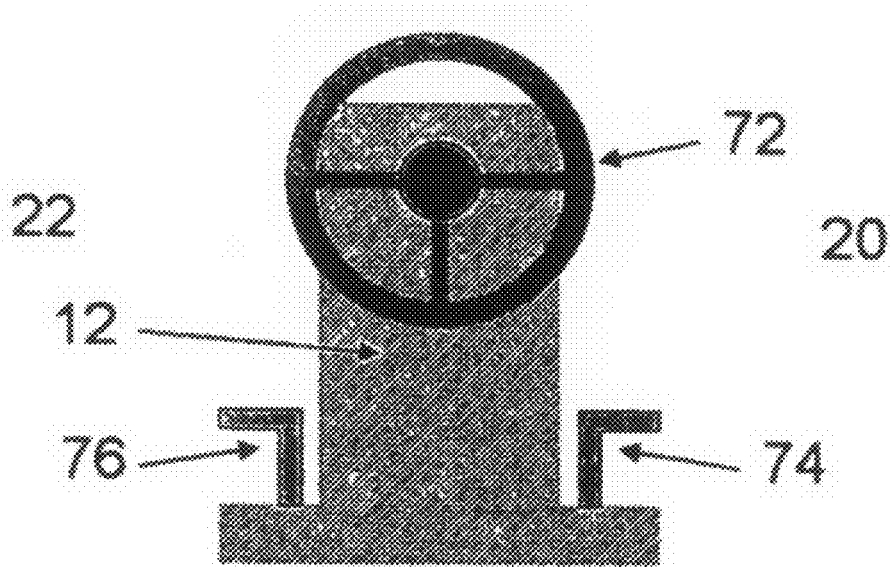
FIG. 10 illustrates another embodiment of a vehicle control system.

Another embodiment of a vehicle control system is shown in FIG. 10. A steering wheel 72 is coupled to the pair of steerable front wheels 26, so that when the steering wheel 72 is rotated about the steering input axis, it causes the pair of steerable front wheels 26 to rotate about the pair of turning axis 30. Affixed to the frame 12 along the right portion 20 is a right-foot throttle-peddle assembly 74 within reach of the right foot of the driver. The right-foot throttle-peddle assembly 74 is coupled to the motor 38 to cause the three-wheeled vehicle 10 to accelerate. Affixed to the frame 12 along the left portion 22 is a left-foot brake-peddle assembly 76 within reach of the left foot of the driver. The left-foot brake-peddle assembly 76 is coupled to at least one of the wheels of the three-wheeled vehicle.

Figure 11:
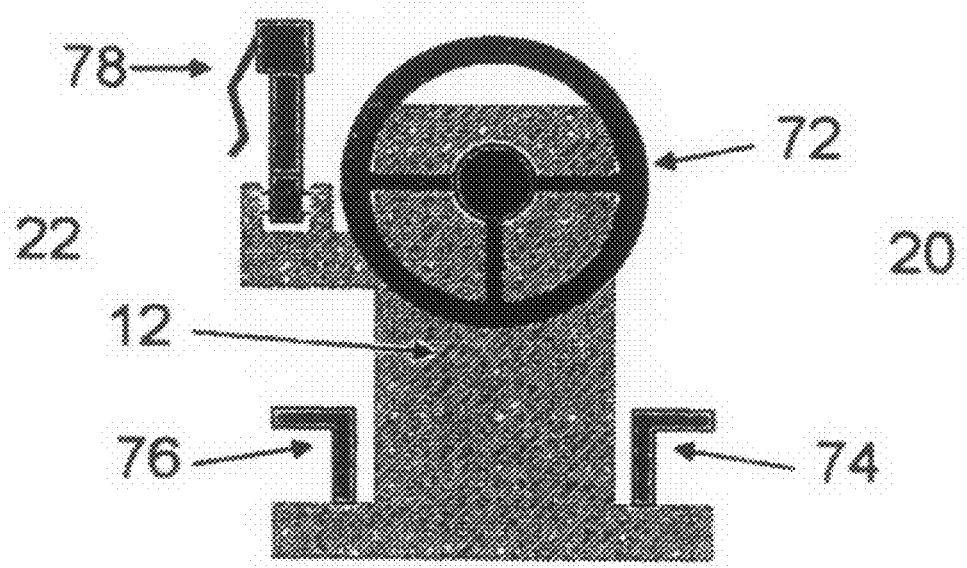
FIG. 11 illustrates another embodiment of a vehicle control system.

Another embodiment of a vehicle control system is shown in FIG. 11. It is similar to the embodiment in FIG. 10, except that a single-hand clutch-shifter control 78 is added. The single-hand clutch-shifter control 78 allows the driver to activate the clutch and shift gears with one hand. The driver can activate the clutch by any suitable method previously discussed, but preferably by depressing a squeezable clutch control. Then the driver can shift gears by rotating or moving the single-hand clutch-shifter control 78 forward and backwards. The single-hand clutch-shifter control 78 is coupled to the clutch so that when the single-hand clutch-shifter control 78 moves forward and backwards it shifts gears on the transmission. Traditional motorcycle transmissions utilize a sequential shift pattern that goes from 1-N-2-3-4-5-6. To up-shift the driver pushes or pulls in one direction and to down-shift the driver pushes or pulls in the opposite direction. The single-hand clutch-shifter control 78 allows the driver to operate the three-wheeled vehicle 10 in a manner similar to a traditional automobile using a steering wheel and foot controls, but while also using a shifting control method that is easily adaptable and similar to a motorcycle engine and transmission combination.

Another embodiment of the vehicle control system can use paddle shifters, placed near either the steering wheel 72 or steering mechanism 46. Paddle shifters have been used in production vehicles and offer an alternative method for selecting gears. Furthermore, a completely clutchless transmission may be used, which eliminates the need to select gears. Additionally, an automatic transmission may be used to transfer power.

In summary, a three-wheeled vehicle for the transportation of a driver is disclosed. An exemplary embodiment of the three-wheeled vehicle has a frame for supporting the driver and a plurality of mechanical devices. The frame has a front portion, a rear portion, a vertical cross plane, a right portion, a left portion, and a vertical center plane. The front portion is opposite the rear portion and is generally divided by the vertical cross plane. The right portion is opposite the left portion and is generally divided by the vertical center plane. A pair of steerable front wheels are rotatably affixed to the frame. The pair of steerable front wheels are positioned at opposite sides of the front portion being equally separated by the vertical center plane. The pair of steerable front wheels rotate in both a pair of rolling axes and a pair of turning axes. The pair of rolling axes allow the pair of steerable front wheels to roll upon a surface. The surface is substantially perpendicular to both the vertical center plane and the vertical cross plane. The pair of rolling axes are substantially parallel with the surface. The pair of turning axes are substantially parallel to both the vertical center plane and the vertical cross plane. The driver can change direction of the pair of steerable front wheels relative to the orientation of the frame about the pair of turning axis through a driver steering input. A rear wheel is rotatably affixed to the frame generally centered along the vertical center plane and positioned about the rear portion behind the vertical cross plane. The rear wheel rotates in a rear rolling axis. The rear rolling axis is substantially parallel to the vertical cross plane and substantially perpendicular to the vertical center plane. The rear wheel can roll upon the surface. The pair of steerable front wheels and the rear wheel are substantially cylindrically shaped. A motor is affixed to the frame generally centered along the vertical center plane. A driver seat is affixed to the frame generally centered along the vertical center plane, behind the motor and ahead of the rear wheel. The driver sitting within the driver seat is in both a recumbent position and a straddle position. The driver seat has a seat bottom and a seat back. The seat bottom is substantially horizontal and the seat back is substantially vertical. The driver seat is generally positioned low within the frame. The driver seat can have lateral support to prevent the driver from falling out of the seat during cornering.

The foregoing description of the exemplary embodiments have been presented for the purposes of illustration and description. It is not intended to be exhaustive or to limit the invention to the precise form disclosed. Many modifications and variations are possible in light of the above teaching. It is intended that the scope of the invention not be limited by this detailed description, but rather by the claims appended hereto and all equivalents thereto.

REFERENCE NUMBER LIST

10 Three-Wheeled Vehicle
12 Frame
14 Front Portion
16 Rear Portion
18 Vertical Cross Plane
20 Right Portion
22 Left Portion
24 Vertical Center Plane
26 Pair of Steerable Front Wheels
28 Pair of Rolling Axes
30 Pair of Turning Axes
32 Surface
34 Rear Wheel
36 Rear Rolling Axis
38 Motor
40 Driver Seat
41 Driver Seat Belt
42 Seat Bottom
43 Passenger Seat
44 Seat Back
45 Passenger Seat Belt
46 Steering Mechanism
48 Center Handlebar Portion
50 Left Handlebar Portion
52 Right Handlebar Portion
54 Steering Input Axis
56 Transmission
58 Rotatable Throttle-Control Assembly
60 Squeezable Brake-Control Assembly
62 Squeezable Clutch-Control Assembly
64 Left-Foot Shifter-Control
66 Right-Foot Brake-Control
68 Right-Hand Throttle-Control Assembly
70 Left-Hand Brake-Control Assembly
72 Steering Wheel
74 Right-Foot Throttle Peddle Assembly
76 Left-Foot Brake Peddle Assembly
78 Single-Hand Clutch-Shifter Control

I claim:

1. A three-wheeled vehicle comprising:
  (a) a structural frame comprising a front half, a rear half, a left side and a right side;
  (b) a left front wheel rotatably attached to the structural frame along the front half and left side;
  (c) a right front wheel rotatably attached to the structural frame along the front half and right side;
  (d) a rear wheel rotatably attached to the structural frame along the rear half approximately centered between the left side and right side;
  (e) a left foot support attached to the structural frame along the front half and left side;
  (f) a right foot support attached to the structural frame along the front half and right side;
  (g) a motor attached to the structural frame approximately centered between the left side and right side wherein the motor separates the left foot support and right foot support, where the motor is further defined as comprising a top and a back; and
  (h) a seat attached to the structural frame approximately centered between the left side and right side and positioned behind the motor and ahead of the rear wheel, where the seat comprises a seat bottom and a seat back, where the seat bottom is generally horizontal and the seat back is generally vertical, wherein the seat bottom is positioned below the top of the motor and behind the back of the motor.

2. The three-wheeled vehicle of claim 1, further comprising a steering wheel rotatably connected to the structural frame centered between the left side and right side and mechanically connected to the left and right front wheels.

3. The three-wheeled vehicle of claim 2, further comprising a single-hand clutch-shifter control attached to the structural frame and mechanically coupled to the motor.

4. The three-wheeled vehicle of claim 3, further comprising a throttle foot-peddle assembly attached to the structural frame integrated with the right foot support, and further comprising a brake foot-peddle assembly attached to the structural frame integrated with the left foot support.

5. The three-wheeled vehicle of claim 1, wherein the seat is juxtapose to the motor and rear wheel and wherein the motor is juxtapose to the left foot support and right foot support.

6. The three-wheeled vehicle of claim 5, wherein the left and right foot supports are positioned ahead of the seat.

7. The three-wheeled vehicle of claim 1, wherein the seat comprises a lateral support.

8. The three-wheeled vehicle of claim 1, wherein the motor and seat are generally positioned within the structural frame at the same distance perpendicular from a surface the three-wheeled vehicle drives upon.

9. A three-wheeled vehicle frame comprising:
(a) a structural frame comprising a front half, a rear half, a left side and a right side;
(b) a left front wheel mounting location attached to the structural frame along the front half and left side;
(c) a right front wheel mounting location attached to the structural frame along the front half and right side;
(d) a rear wheel mounting location attached to the structural frame along the rear half approximately centered between the left side and right side;
(e) a left foot support mounting location attached to the structural frame along the front half and left side;
(f) a right foot support mounting location attached to the structural frame along the front half and right side;
(g) a motor mounting location attached to the structural frame approximately centered between the left side and right side wherein the motor mounting location separates the left foot support mounting location and right foot support mounting location; and
(h) a seat mounting location affixed to the structural frame approximately centered between the left side and right side and further positioned ahead of the rear wheel mounting location and behind the motor mounting location, where the structural frame is further defined as comprising a common plane wherein the common plane is horizontally disposed and generally spans through the left and right front wheel mounting locations, rear wheel mounting location, motor mounting location and seat mounting location.

10. The three-wheeled vehicle frame of claim 9, wherein the left foot support mounting location and right foot support mounting location are both positioned juxtapose to the motor mounting location and ahead of the seat mounting location, and wherein the seat mounting location is juxtaposed to and between the motor mounting location and rear wheel mounting location.

11. A three-wheeled vehicle comprising:
(a) a vehicle frame comprising two front tires and a rear tire wherein the tires are rotatably coupled to the vehicle frame and wherein the rear tire is positioned along a middle of the vehicle frame;
(b) a motor attached along the middle of the vehicle frame ahead of the rear tire wherein the motor comprises a back end defined as an end of the motor closest to the rear tire;
(c) a seat attached to the middle of the vehicle frame and positioned ahead of the rear tire and positioned behind the back end of the motor wherein the seat is between and juxtapose to both the motor and the rear tire; and
(d) two foot supports attached to the vehicle frame approximately equal distance from the middle of the vehicle frame and separated by and juxtaposed to the motor and further positioned ahead of the seat, wherein the vehicle frame is further defined as comprising a common plane wherein the common plane is horizontally disposed and generally spans through the front tires, rear tire, motor and seat.

12. The three-wheeled vehicle of claim 11, further comprising a seat belt attached to the vehicle frame.

13. The three-wheeled vehicle of claim 11, wherein the seat comprises a lateral support.

14. The three-wheeled vehicle of claim 11, wherein the seat comprises a seat bottom and a seat back, wherein the seat bottom is generally horizontal and the seat back is generally vertical.

15. The three-wheeled vehicle of claim 14, wherein the motor is further defined as comprising a top of the motor wherein the seat bottom is below the top of the motor.

16. The three-wheeled vehicle of claim 11, wherein the seat is positioned low within the vehicle frame wherein the seat is directly behind and juxtapose to the motor.

17. The three-wheeled vehicle of claim 11, further comprising a steering wheel rotatably connected to the middle of the vehicle frame and mechanically coupled to the two front tires, and further comprising a single-hand clutch-shifter control attached to the vehicle frame and mechanically coupled to the motor, and further comprising a throttle foot-peddle assembly attached to the vehicle frame integrated with the two foot supports, and further comprising a brake foot-peddle assembly attached to the structural frame also integrated with the two foot supports.

18. A three-wheeled vehicle comprising:
(a) a vehicle frame comprising two front tires and a rear tire wherein the tires are rotatably coupled to the vehicle frame and wherein the rear tire is positioned along a middle of the vehicle frame;
(b) a motor attached along the middle of the vehicle frame;
(c) two foot supports attached to the vehicle frame approximately equal distance from the middle of the vehicle frame and separated by the motor; and
(d) a seat bottom attached to the middle of the vehicle frame juxtaposed between the motor and the rear tire, wherein the seat bottom is behind a rearwardmost portion of the motor and below a topwardmost portion of the motor.

* * * * *